Jan. 27, 1970 WILLIAM I. H. CHEN ET AL 3,492,606

TRANSVERSAL FILTERS

Filed July 14, 1966 5 Sheets-Sheet 1

INVENTORS W. I. H. CHEN
R. C. LEVINE
BY Leo Stanger
ATTORNEY

Jan. 27, 1970 WILLIAM I. H. CHEN ET AL 3,492,606

TRANSVERSAL FILTERS

Filed July 14, 1966 5 Sheets-Sheet 3

United States Patent Office 3,492,606
Patented Jan. 27, 1970

3,492,606
TRANSVERSAL FILTERS
William I. H. Chen, New York, N.Y., and Richard C. Levine, Plainfield, N.J., assignors to Bell Telephone Laboratories, Incorporated, Murray Hill, N.J., a corporation of New York
Filed July 14, 1966, Ser. No. 565,290
Int. Cl. H03h 7/10
U.S. Cl. 333—70 14 Claims

ABSTRACT OF THE DISCLOSURE

An elongated resistive capacitor forms a dispersive line for a transversal filter. Multipliers at successive distances along the line sense distorted images of an input to one end of the line. Summing means combine the signals from each multiplier with previous multiplier signal so that each combined signal more closely approximates a desired transfer function.

This invention relates to energy transfer devices, and particularly to so-called transversal filters which instead of operating upon an input waveform by selective attenuation of specified frequency components do so by the technique of time domain synthesis.

Known transversal filters transform an input waveform by delaying it in a delay line so as to establish successive time-displaced images of the input waveform at equally spaced locations along the line, and then by assembling predetermined proportions of these time-displaced images into a complete output in a summing circuit. By varying the polarity and proportions of the assembled images such a filter can be assigned a wide variety of transfer functions that might otherwise be exceedingly difficult to obtain.

For achieving any particular transfer function the filter's parameters are chosen to produce the impulse response characteristics of the transfer function. This impulse response represents the mathematically predetermined waveform that a hypothetical network having the desired transfer function produces from a unit pulse input. The unit pulse makes a particularly suitable input waveform for selecting the tap coefficient parameters because it contains signal energy distributed equally throughout the complete frequency spectrum. Furthermore, any input function can be considered a scaled combination of time contiguous unit pulses. Thus, conclusions based upon this unit input pulse are valid for virtually all inputs. Moreover unit pulses time-displaced by a delay line are respectively orthogonal and do not overlap each other when assembled into an output waveform. Examples of transversal filters appear in detail in U.S. Patents 2,024,900, 2,124,599 and 2,128,257.

Filters based upon time delays of the input signal tend to be extremely large and bulky. This is because their delay lines demand extraordinarily long cables or artificial delay components including bulky inductors. This limits the use of such filters to applications where they are so essential that their cumbersome and expensive character must be tolerated.

Aside from their normally large size, such transversal filters exhibit only a limited ability to produce a high Q response. A high Q filter normally prolongs the time period over which a pulse or other waveform exists. However, time-delay transversal filters have limited capacities to prolong an input pulse. For example, to prolong a one-microsecond pulse to two microseconds, requires a transmission line over 1000 feet or a comparable artificial delay line. Thus, previous transversal filters have found employment largely in low Q applications.

As a further point, transversal filters employing the time-delay principle need a large number of taps along the delay line from which the output waveform is assembled. In fact, there must be several taps for each peak in most impulse responses. This is so because each image of a unit pulse is also a pulse. Thus, a single wide peak in an impulse response such as a sinusoid requires assembling several narrow image pulses.

An object of this invention is to simpify transversal filters.

Another object is to expand the suitability of transversal filters, particularly for high Q applications.

Another object of this invention is to reduce the bulk of transversal filters by eliminating the need for long delay lines.

Still another object of the invention is to achieve small transversal filters by eliminating the need for the inductive components of the delay line.

Still another object is to enable reduction of the number of taps in the line for many classes of filters.

Still another object of the invention is to substitute, for delay lines in transversal filters, other devices which are so small as to be capable of production as thin film circuits.

Yet another object of the invention is to improve transversal filters to such a point as to make mass production of these devices feasible and inexpensive.

These objects are achieved according to the invention not by delaying the input waveforms, but by "smearing" or distorting them in time in a dispersive structure and assembling fractions of the signals that appear along the structure at taps whose distribution is determined according to the character of the transfer function. Preferably for each tap signal the establishment of the fraction to be assembled is accomplished by an independent linear component or circuit whose output is added to the outputs of the other independent components or circuits.

The invention is based on the realization that, without ever creating a set of orthogonal subwaveforms for which purpose a delay line was considered essential, and because the mathematics involves linear and mathematically associative operations, single properly-calibrated components or circuits, each responding to only one overlapping subwaveform, can perform the equivalent of the operations of combining the subwaveforms into a set of orthogonal signals and assembling proportions of these signals on the basis of the desired impulse response.

The values of the linear components or circuits may be calibrated on the basis of trial and error or by computation. It is in computing these values that the mathematical set of orthogonal and normal functions are utilized. However, these are associatively broken-out into their component waveform values which are then added together. The orthogonal waveforms never appear physically as measurable responses.

The computation, for example, involves detemining what shares of subwaveforms, appearing at the taps, must be combined to form a series of orthogonal and normal (i.e., orthonormal) functions, and what proportions of these orthonormal functions must be combined to form the desired impulse response. As stated, these operations have been found to be mathematically associative so that the shares and proportions could be collected into fractions of the individual subwaveforms that have to be combined to produce a desired impulse response. Obtaining these fractions is performable by single independent components.

The dispersive structures, even when quite small can stretch input pulses indefinitely in time. In fact, transversal filters according to the invention may have dispersive structures that stretch pulses over long periods and that form part of thin film circuits, thus eliminating the objections concerning both the size and low Q applications of prior transversal filters. Quite apart from their sizes, transversal filters according to the invention exhibit subwaveforms from unit pulse inputs conformable to gradual peaks in the desired impulse response. Thus the number of taps necessary for smoothly synthesizing an impulse response waveform or transfer function are less than those necessary in prior filters of this type.

Transversal filters according to the invention may include a dispersive structure in the form of a dispersive transmission line, wherein the distances between consecutive taps may correspond to the rate of peak dispersion in the line; specifically the distances from the input may be substantially proportional to the roots of successive integers. The dispersive line may be composed exclusively of resistive and capacitive portions so that it can occupy very little space.

In one embodiment, the dispersive structure comprises a thin film circuit wherein an insulating substrate supports a resistive layer underneath an insulating layer that separates the resistive layer from a top conductive layer. This structure corresponds to a resistor plate separated from a conductor plate to from a distributed capacitor. The input appears at one end of the layer across this capacitor and the subwaveforms are taken at terminals across the resistive and conductive layers at locations separated from the input by successive distances corresponding to, for example, $\sqrt{1}$, $\sqrt{2}$, $\sqrt{3}$, etc. Resistors or amplifiers from these locations feed the signals into a summing circuit to produce an output waveform.

These and other novel features of the invention are pointed out in the claims. Other objects and advantages of the invention will become obvious from the following detailed description when read in light of the accompanying drawings wherein:

Figure 1:
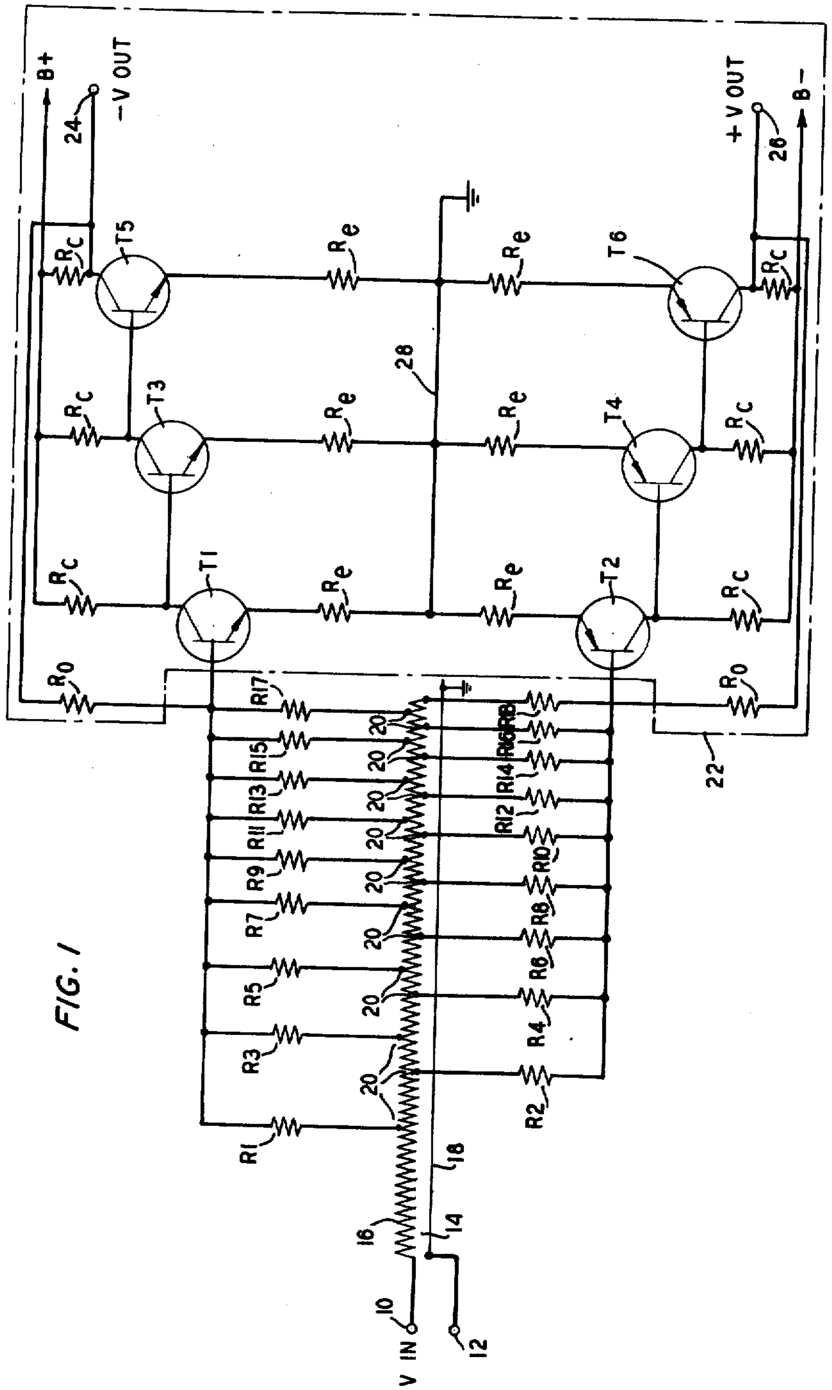
FIG. 1 is a schematic diagram illustrating a transversal filter that embodies features of the invention.

In FIG. 1 an input waveform is applied to two terminals 10 and 12 at the end of an RC line 14 composed of a continuous resistance 16 separated from a conductive plate 18 so as to form a uniform distributed capacitance between the resistor 16 and the plate 18. The resistance of resistor 16 is also uniform. The input signal produces voltages or subwaveforms at all points along the line. However, because of the distributed capacitance the voltages at these points are smeared, that is, although they start to build up immediately at any point along the line, they rise and decrease more slowly than the energizing unit-pulse input signal. Further and further along the line 14, the accumulated time constant becomes greater and the voltages of the measured waveforms follow the input signal more slowly. For a unit-pulse input signal the time from the start of the subwaveform to the subwaveform peak increases as the square of the distance from the terminals 10 and 12. This is shown for several equally spaced locations along the line in the curves $A_1$ to $A_n$ of FIG. 2.

Figure 2:
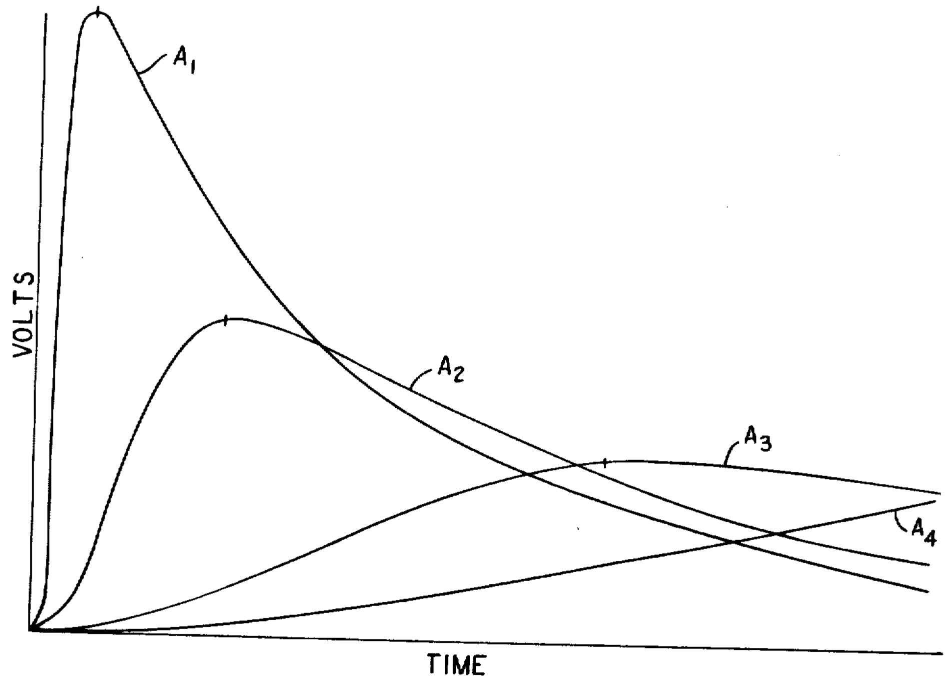
FIGS. 2 and 3 are diagrams illustrating subwaveforms developed by the circuit of FIG. 1.

In order to obtain uniform spacing of the peaks in FIG. 2, taps $T_1$ to $T_{18}$ of FIG. 1, located along resistor 16 at points X, $X\sqrt{2}$, $X\sqrt{3}$ . . . $X\sqrt{18}$ from the left end of resistor 16 sense the smeared voltages. For a unit-pulse input the subwaveforms at the taps $T_1$ to $T_{18}$ have the respective wapeshapes $W_1$ to $W_n$ shown in FIG. 3.

The voltages or subwaveforms at each tap start simultaneously. However, because the accumulated time constant between each tap and the input terminals 10 and 12 gets progressively greater, the voltage buildup and decline is slower at the taps more remote from the terminals.

Connected to each of the taps $T_1$ to $T_{18}$ and selecting a proportion of the subwaveforms appearing at the taps, are respective ones of preselected resistors $R_1$, $R_2$, $R_3$ . . . to $R_n$. These resistors, serving here as multipliers, pass their respective sensed signals to a single summing circuit generally designated 22 which produces an output at terminals 24 and 26. In the present case the summation and collection of the sensed signal is accomplished by connecting the resistors having the odd-numbered subscripts, namely $R_1$, $R_3$ . . . to one base of an NPN transistor T1 and connecting the resistors having even subscripts, namely $R_2$, $R_4$ . . . to a base of a PNP transistor T2. The transistors form part of a balanced-transistor direct-coupled amplifier having further transistors T3, T4, T5 and T6. Suitable resistors $R_e$ join the respective emitters of the transistors T1 to T6 to a ground line 28. A B+ source and a B− source provide respective collector voltages to the transistor collectors through respective resistors $R_C$. Transistors T1 and T2 apply their respective outputs to the bases of the transistors T3 and T4, respectively. The latter, in turn, after amplifying the input signals apply their outputs to the bases of transistors T5 and T6. Resistors $R_0$ lead a portion of the output voltage at the collectors of transistors T5 and T6 back to the bases of transistors T1 and T2. This stabilizes and maintains a substantially constant amplification in the amplifier 22.

The amplifier 22 substantially adds the voltages appearing at the resistors $R_1$ to $R_n$ together so as to produce the desired output function. An example of the impulse response of such a circuit is shown in FIG. 4.

Figure 4:
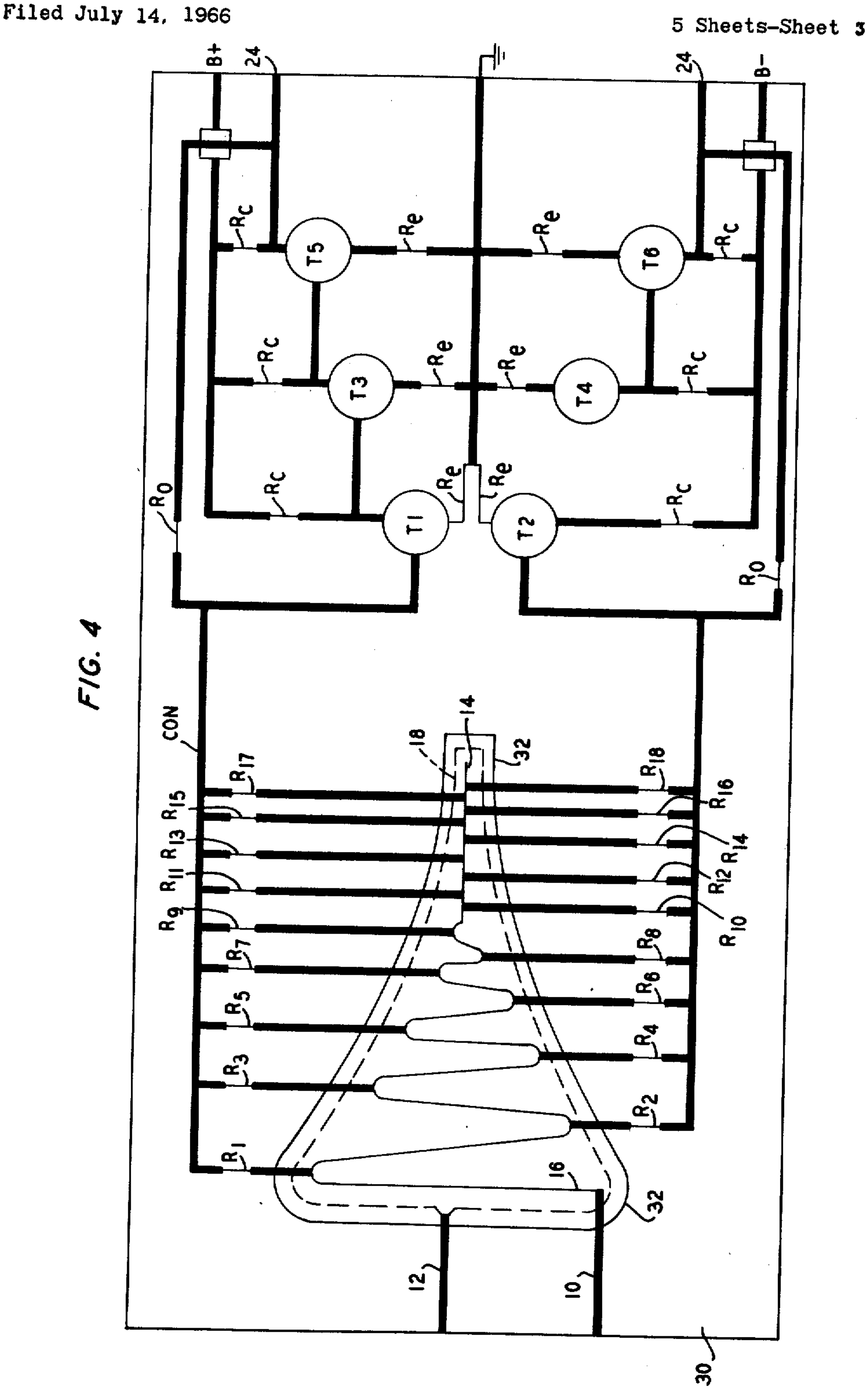
FIG. 4 is a plan view of a thin film circuit of the filter in FIG. 1.

FIG. 4 illustrates the manner in which the circuit of FIG. 1 may be realized in a thin film configuration. Here components corresponding to the components of FIG. 1 are designated with like numerals. The entire structure is supported on an insulating substrate 30. The conductors CON may, for example, be composed of gold and deposited upon the substrate 30 in the manner well known in the art of fabricating thin films. The resistors preferably consist of nickel, chromium or tantalum and appear generally as the thinner lines joining portions of the conductors.

The RC line 14 appears in FIG. 4 as a somewhat trapezoidal plate 18 deposited on the substrate 30 and covered with an insulating layer 32. The resistor 16 constitutes a continuous line deposition of resistive material following a zigzag path within the limits and boundaries of the plate 18. This resistor 16 is deposited over the insulating layer 32. The respective lengths 34 of resistor 16, that is to say the zigzag legs, are such that they are successively spaced from the input terminal end 12 of the resistor along the resistor path distances equal to X, $X\sqrt{2}$, $X\sqrt{3}$ . . . $X\sqrt{18}$.

The desired transfer function uniquely defines the impulse response of the circuit in FIG. 1. The impulse response establishes the needed relative values of resistors $R_1$ to $R_{18}$. These values may be obtained by trial and error or by calculation.

Figure 3:
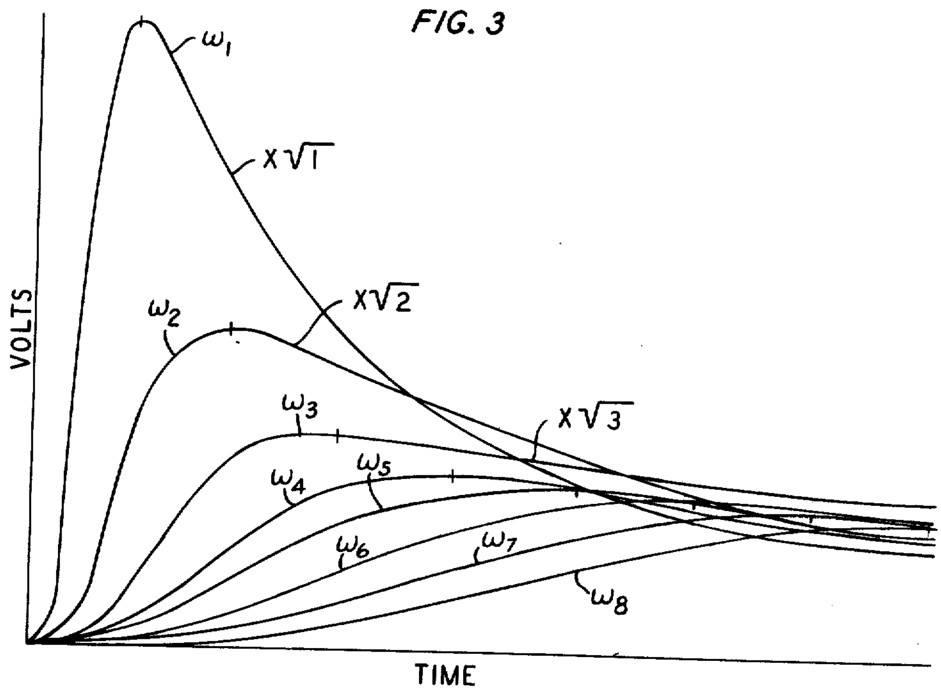

The calculation of the values of resistors $R_1$ to $R_{18}$ for any particular impulse response first involves a purely mathematical step to obtain from the set of subwaveforms functions having the character of the subwaveform sets previously at the taps in transversal filters using delay lines, namely, orthogonality. Mathematically, these waveforms are also normalized. They are thus made orthonormal. In the present case the subwaveforms appearing at the taps when line 14 is subjected to a unit pulse input overlap as shown in FIG. 3. Thus the calculation involves determining what share of each tap subwaveform is necessary in each of a number of respective functions that form an orthonormal set. This determination is purely mathematical. That it can be done is shown in "Statistical Theory of Communication" by Y. W. Lee, published in 1960 by John Wiley & Sons, Inc. of New York and London, particularly in chapters 18 and 19. The proportion of each mathematically calculated orthonormal function necessary to form the impulse response is then computed. The impulse response is then obtained by multiplying the respective subwaveform shares in each orthonormal function with the multiplier of the orthonormal function to establish a proportion for each subwaveform, and then adding all the proportions of the subwaveforms together. The proportions are entered into the circuit by varying the values of resistors $R_1$ to $R_{18}$.

A set of continuous functions $w_n(t)$ $(n=1, 2, \ldots)$ consisting of $w_1(t)$, $w_2(t)$ . . . is said to be normal in a range $(a, b)$ if $$\int_a^b w_m(t)w_n(t)dt=1, \text{ where } m=n \qquad (1)$$

or $$\int_a^b [w_m(t)]^2dt=1$$

and to be orthogonal if $$\int_a^b w_m(t)w_n(t)dt=0, \text{ where } m\neq n \qquad (2)$$

Where both conditions exist the set is said to be orthonormal.

The waveforms which must be combined into the orthonormal set in this case appear at taps 20 and are shown by the impulse responses in FIG. 3. The general form of each curve of these waveforms is $$h_n(x_n, t)=\sqrt{\frac{rc}{4\pi t^3}}x_n e^{-\frac{rcx_n^2}{4t}} \qquad (3)$$

where $x_n$ is the distance to the tap $n$, $r$ is the resistance per unit length and $c$ is the capacitance per unit length.

To obtain the first function $w_1(t)$ in the orthonormalized set $w_n(t)$ that must satisfy Equations 1 and 2 we use a share A of the subwaveform $h_1(x_1, t)$ at the first tap so that $w_1(t)=Ah_1(x_1, t)$. We find $w_1(t)$ and A from $$\int_0^\infty [w_1(t)]^2dt=1=\int_0^\infty [Ah(x_1, t)]^2dt \qquad (4)$$

When the waveform $w_1(t)$ conforms to the Equation 1 it is normalized. It need not be orthogonalized. The other waveforms are orthogonalized with respect to it.

The second orthonormal function $w_2(t)$ contains shares $B_1$ and $B_2$ of both the first and second subwaveforms $h_1(x_1, t)$ and $h_2(x_2, t)$. Thus, $$w_2(t)=B_1h_1(x_1, t)+B_2h_2(x_2, t) \qquad (5)$$

We obtain $w_2(t)$, $B_1$, and $B_2$ from $$\int_0^\infty [w_2(t)]^2dt=1=\int_0^\infty [B_1h_1(x_1, t)+B_2h_2(x_2, t)]^2dt \qquad (6)$$

and $$\int_0^\infty w_1(t)w_2(t)dt=0=\int_0^\infty Ah_1(x_1, t)[B_1h_1(x_1, t)+B_2h_2(x_2, t)]dt \qquad (7)$$

We then find $w_3(t)=C_1h_1(x_1, t)+C_2h_2(x_2, t)+C_3h_3(x_3, t)$ from the equations $$\int_0^\infty [w_3(t)]^2dt=1=\int_0^\infty [C_1h_1(x_1, t)+C_2h_2(x_2, t)+C_3h_3(x_3, t)]^2dt \qquad (8)$$

and $$\int_0^\infty w_1(t)w_3(t)dt=0=\int_0^\infty Ah_1(x_1, t)[C_1h_1(x_1, t)+C_2h_2(x_2, t)+C_3h_3(x_3, t)]dt \qquad (9)$$

and $$\int_0^\infty w_2(t)w_3(t)dt=0=\int_0^\infty [B_1h_1(x_1t)+B_2h_2(x_2, t)][C_1h_1(x_1, t)+C_2h_2(x_2, t)+C_3h_3(x_3, t)]dt \qquad (10)$$

The process continues for the other terms where $n=4 \ldots 18$.

Proportions $q_n$ of each orthonormalized function $w_n(t)$, namely, $q_nw_n(t)$, are assembled into at least mean square error approximation, $\tilde{h}(t)$, of the desired impulse response, $h(t)$. In mathematical terms, $$\tilde{h}(t)=\sum_{m=1}^{18} q_nw_n(t)\approx h(t)$$

Each proportion $q_n$ needed can be explicitly determined from the desired impulse response $h(t)$ by the formula $$q_n=\int_0^\infty h(t)w_n(t)dt, \text{ for } n=1, \ldots 18 \qquad (11)$$

Figures 5, 6:
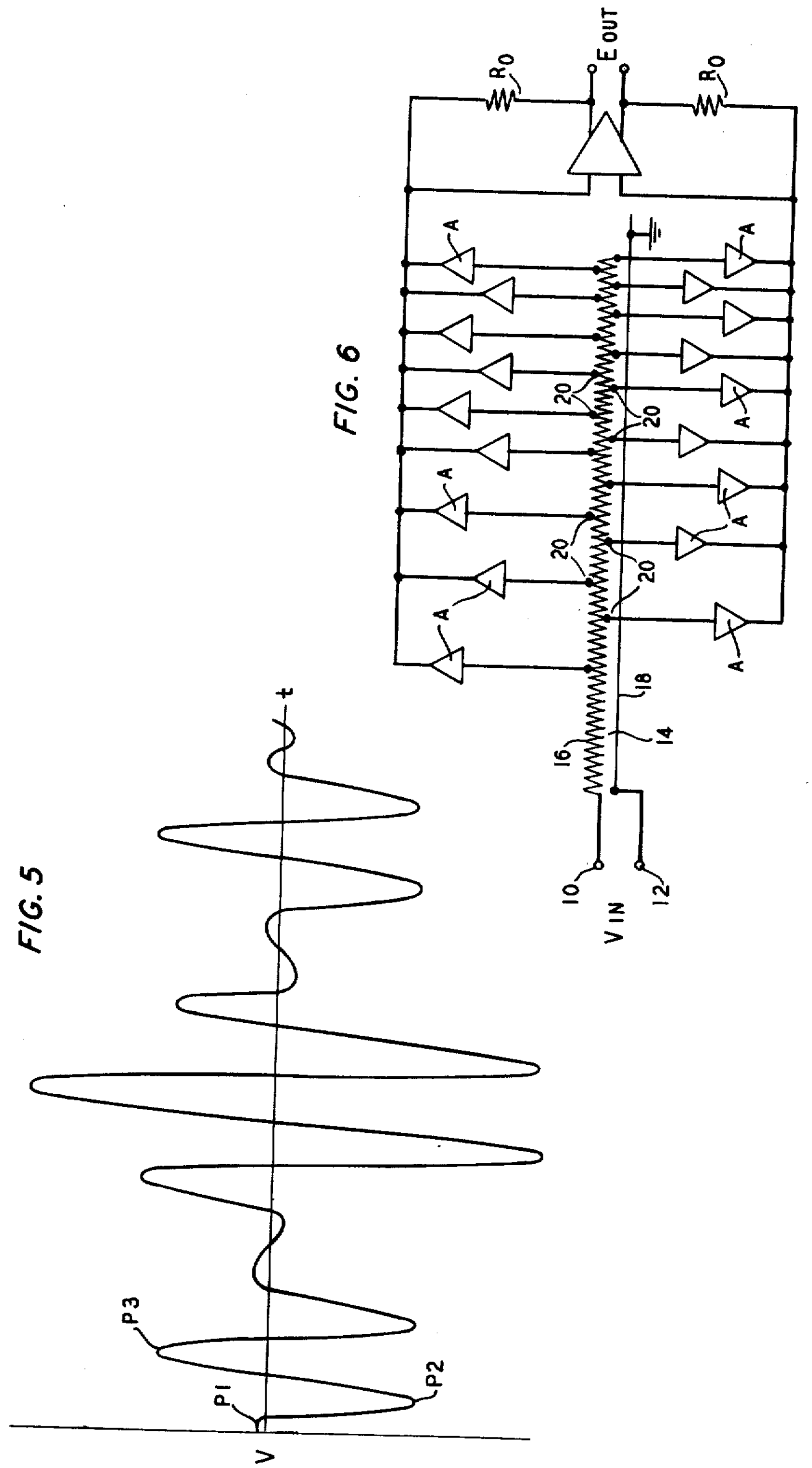
FIG. 5 is a diagram illustrating the impulse response of the circuit in FIG. 1.
FIG. 6 is a schematic diagram of another transversal filter embodying features of the invention.

Each $w_n(t)$ now represents a numerical share A, $B_1$, $B_2$, $C_1$ . . . of each $h_n(x_n, t)$. Each $q_n$ now represents the numerical proportion of each $w_n(t)$ existing in the total impulse response $\tilde{h}(t)$ such as shown in FIG. 5. Thus, each $q_nw_n(t)$ is composed of respective numerical multiples of $h_n(x_n, t)$. Similarly $$\tilde{h}(t)=\sum_{n=1}^{18} q_nw_n(t)\approx h(t)$$

is composed of respective numerical multiples of $h_n(x_n, t)$. The various common factors can be explicitly collected into coefficients for $h_n(x_n, t)$ in the form $$\begin{aligned}\tilde{h}(t)=&[q_1A+q_2B_1+q_3C_1\ldots]h_1(x_1, t)\\ &+[q_2B_2+q_3C_3+q_4D_2\ldots]h_2(x_2, t)\\ &+[q_3C_3+q_4D_3+q_5E_3\ldots]h_3(x_3, t)\\ &\quad\vdots\\ &+[\qquad\qquad\qquad]h_{18}(x_{18}, t)\approx h(t)\end{aligned} \qquad (12)$$

In other words, the desired impulse response $h(t)$ is closely approximated or synthesized directly from multiples of the subwaveforms at the taps 14. No actual orthonormal waveforms need exist. The complete fraction of each subwaveform $h_n(x_n, t)$ in FIG. 1 is numerically equal to the calibration ratio of the feedback resistor $R_0$ to the resistors $R_n(n=1, 2, \ldots)$. For example $$\frac{R_0}{R_1}=[q_1A+q_2B_1+q_3C_1\ldots] \qquad (13)$$

Thus the value of $$R_1=\frac{R_0}{q_1A+q_2B_1+q_3C_1\ldots} \qquad (14)$$

Similar relations exist between the coefficients of the other subwaveforms $h_n(x_n, t)$ and $R_0/R_n$. The values of the other resistors are chosen from these relations.

The expression for the impulse response at any tap $n$, $h_n(x_n, t)$ is shown at Equation 3. It is derived from the basic equations for a uniform distributed line as follows:

$$-\frac{\partial}{\partial x}V(x,t)=rI(x,t)$$

$$-\frac{\partial}{\partial x}I(x,t)=c\frac{\partial}{\partial t}V(x,t) \qquad (15)$$

where:

$r$ is resistance per unit length, and $c$ is capacitance per unit length, as is shown in, for example, Linear Transient Analysis, volume II, by Ernest Weber, published by John Wiley & Sons.

These equations can be combined into $$\frac{\partial^2}{\partial x^2}V(x,t)=\tau\frac{\partial}{\partial t}V(x,t) \qquad (16)$$

where $\tau=rc$.

The solution of this equation in the frequency domain is of the form $$V(x,s)=Ae^{\sqrt{\tau s}\,x}+Be^{-\sqrt{\tau s}\,x} \qquad (17)$$

where $s=\sigma+j\omega$ is the complex frequency. For the special case of a semi-infinite line $$V(x,s)=V(o,s)e^{-\sqrt{\tau s}\,x} \qquad (18)$$

Thus, the voltage transfer function between the input at $x=0$, and a point $x$ on the semi-infinite line is $$H(x,s)=e^{-\sqrt{\tau s}\,x} \qquad (19)$$

By inverse Laplace transformation, the impulse response anywhere is $$h(x,s)=-\sqrt{\frac{\tau}{4\pi}}\frac{x}{\sqrt{t^3}}e^{-\frac{\tau x^2}{4t}} \qquad (20)$$

Additional information can be derived. For example, combining Equations 17 and 15 gives the current as $$I(x,s)=-\frac{\sqrt{\tau s}}{r}\left(Ae^{\sqrt{\tau s}\,x}-Be^{-\sqrt{\tau s}\,x}\right)$$

$$=\frac{1}{Z_c}\left(-Ae^{\sqrt{\tau s}\,x}+Be^{-\sqrt{\tau s}\,x}\right) \qquad (21)$$

in which the symbol $Z_c$ represents the characteristic impedance of the line:

$$Z_c=\sqrt{\frac{r}{cs}} \qquad (22)$$

$Z_c$ is not rational in $s$ which implies that the line cannot be terminated without reflection by a finite passive network.

Equation 12 shows that the total impulse response at a tap located at $x_n$ from the input end, is:

$$h_n(x_n,t)=\sqrt{\frac{\tau}{4\pi}}\frac{x_n}{\sqrt{t^3}}e^{-\frac{\tau x_n^2}{4t}} \qquad (23)$$

The transversal filter output, being a linear combination of impulse response at each tap, has the general forms $$h(t)=\sum_{n=1}^{N}\alpha_n\sqrt{\frac{\tau}{4\pi}}\frac{x_n}{\sqrt{t^3}}e^{-\frac{\tau x_n^2}{4t}} \qquad (24)$$

or, alternatively $$=\sqrt{\frac{\tau}{4\pi}}\frac{1}{\sqrt{t^3}}\sum_{n=1}^{N}\alpha_n x_n e^{-\frac{\tau x_n^2}{4t}} \qquad (25)$$

or, to show yet another alternate notation $$=\sqrt{\frac{\tau}{4\pi}}\frac{1}{\sqrt{t}}\sum_{n=1}^{N}\alpha_n x_n\frac{1}{t}e^{-\frac{\tau x_n^2}{4t}} \qquad (26)$$

In operation an impulse response such as the one in FIG. 5 is obtained from the input pulse of FIG. 1 because the RC line smears the energy of the input pulse indefinitely in time and in a different manner at each tap as shown in FIG. 4. In the particular example of FIGS. 1 and 2 the peaks of the subwaveforms occur at later and later times from tap to tap. This decrease occurs at the rate according to the formula $x^2/t$ where $x$ is the distance from input to the RC line and $t$ is the time. By spacing the taps along the line according to the square root of the distance from the input, the successive peaks in the subwaveforms occur at equally spaced time intervals. These equal time spaces are useful for achieving the impulse response of FIG. 5 because the peaks in FIG. 3 are also spaced equally in time.

Only one tap is needed for each peak because the subwaveforms are broad. Several unit pulses need not be assembled for each peak.

The time domain output signal of the transversal RC filter is a linear combination of dispersed versions of the input signal. The RC line offers a time interval to the peak of the output pulse of much longer duration than that of a delay line of the same physical size. Thus, RC lines and RC transversal filters are potentially useful even though they may have comparatively small dimensions as illustrated in FIGS. 1 and 4. Since long delays are possible the RC line is potentially useful at low frequencies as well as high frequencies, and for achieving high Q's as well as low Q's.

Figure 7:
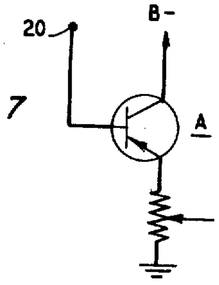
FIG. 7 is a schematic diagram of one of the amplifiers in FIG. 6.

The computed proportions of the subwaveforms at the taps 20 may, in FIGS. 1 and 4 also be established with amplifiers such as emitter followers whose load resistors constitute a voltage divider. Such amplifiers have the advantage of high input impedances which will not draw any substantial current from the taps. Moreover, such amplifiers are amenable to thin film fabrication techniques and are less critical than the precision resistors necessary with the circuit of FIG. 3. An example of such a circuit appears in FIG. 6 where each amplifier A substitutes for a resistor $R_1$ to $R_{18}$ in FIG. 1. Each amplifier is an emitter follower with a voltage divider output as shown in FIG. 7. The remaining reference numerals correspond to FIG. 1.

Figure 8:
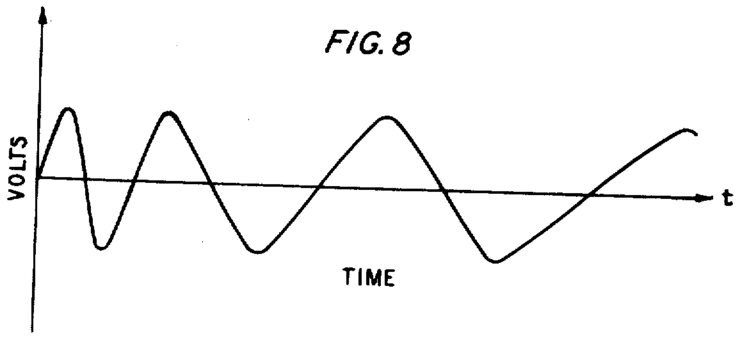
FIG. 8 is a schematic diagram of another impulse response.
Figure 9:
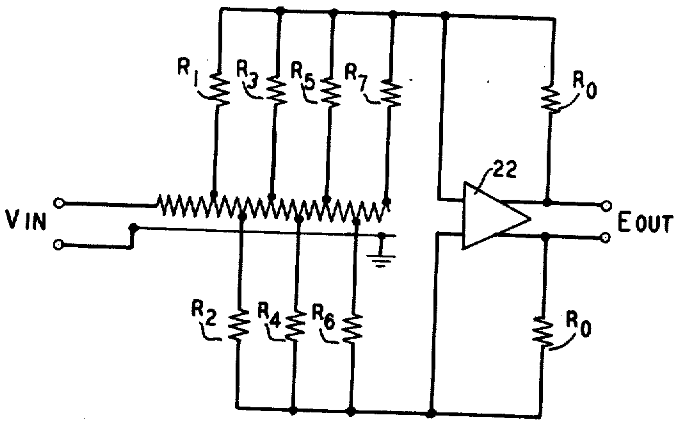
FIG. 9 is a schematic diagram of a circuit embodying the invention for producing the impulse response of FIG. 8.

The tap spacing illustrated in FIG. 1 shows only one possibility. It may represent any type of spacing. For example, equally spaced taps producing the waveforms shown in FIG. 2 are useful for furnishing so-called Chirp filters where the impulse response is frequency modulated as shown in FIG. 8. A circuit for a Chirp filter appears in FIG. 9. Here reference numerals correspond to those of FIG. 1. Since FIG. 8 has seven peaks, FIG. 9 has seven proportioning resistors $R_1$ to $R_7$.

In general, optimal results are achieved when the taps are spaced according to rules that satisfy the condition that $$\sum_{n=1}^{\infty}\frac{1+(2\cdot x_n^2)}{1+x_n^4} \qquad (27)$$

not converge to a finite number.

In this manner the rules satisfy the completeness conditions given in a German language article whose title translates "The Approximation of Continuous Functions by Means of Stated Function Sequences," by Szasz in Mathematische Annallen, vol. 104, 1930, page 366, and in "Fourier Transformers," chapter 2, by R.E.A.C. Paley and N. Wiener published by the American Mathematical Society, Providence, R.I. in 1934.

While embodiments of the invention have been described in detail, it will be obvious to those skilled in the art that the invention may be embodied otherwise without departing from its spirit and scope.

What is claimed is:

1. A transfer device for an input having component frequencies and for producing a desired transfer function, comprising frequency dispersive means for attenuating and distorting the input function by delaying all its component frequencies at different rates, input means connected to said dispersive means, said dispersive means forming a path of signal flow from said input means, sensing means on said dispersive means and located from said input means at successive distances along said path of signal flow, multiplier means for obtaining multiples of the signals appearing at said sensing means, summing means for combining the signals from each of said multiplier means with previous multiplier signals so that each combined signal more closely approximates the desired transfer function.

2. A device as in claim 1 wherein said dispersive means includes a distributed resistor-capacitor line.

3. A device as in claim 2 wherein each of said sensing means includes a tap connected to said resistor-capacitor line.

4. A device as in claim 1 wherein said dispersive means includes a resistor insulated from a conductor to form a distributed capacitance.

5. A device as in claim 1 wherein said dispersive means comprise a thin resistor film, a thin conductor plate, an insulation sheet separating said resistor sheet from said conductor plate, and a substrate, said film, said plate and said conductor comprising thin films deposited on said substrate and forming said path of signal flow.

6. A device as in claim 1 wherein each of said multiplier means are mutually independent and include substantially linear voltage proportioning means responding to signals at said sensing means.

7. A device as in claim 1 wherein said multiplier means each includes a resistor.

8. A device as in claim 1 wherein said multiplier means each includes an amplifier and means for obtaining a predetermined proportion of the output of said amplifier.

9. A device as in claim 1 wherein the signals at said sensing means are nonorthogonal and wherein said multiplier means include means for combining portions of the signals according to proportions determined by the superposition of orthonormalized signals.

10. A device as in claim 1 wherein said sensing means are located at equally spaced positions along said path.

11. A device as in claim 1 wherein said sensing means are located at distances $x$ from said input and along said path according to rules that satisfy the condition that $$\sum_{n=1}^{\infty} \frac{1+(\alpha x_n^2)}{1+x^4}$$

not converge to a finite number.

12. A device as in claim 1 wherein said sensing means and along said path are located at distances from said input means proportioned to a positive or negative power of the consecutive integers.

13. A device as in claim 11 wherein said sensing means each includes a resistor.

14. A dévice as in claim 11 wherein said sensing means each includes an amplifier and means for obtaining a predetermined proportion of the output of said amplifier.

References Cited

UNITED STATES PATENTS

| | | | |
|---|---|---|---|
| 1,315,539 | 9/1919 | Carson. | |
| 2,024,900 | 12/1935 | Wiener et al. | 333—20 |
| 3,268,836 | 7/1966 | Linke | 333—20 |
| 3,271,703 | 9/1966 | Kaenel | 333—28 |
| 3,289,195 | 11/1966 | Townsend | 333—20 X |
| 3,297,951 | 1/1967 | Blasbalg | 333—28 X |

HERMAN KARL SAALBACH, Primary Examiner

S. CHATMON, Jr., Assistant Examiner

U.S. Cl. X.R.

333—29, 73, 76; 328—38, 178